(12) United States Patent
Hsu

(10) Patent No.: US 7,327,279 B2
(45) Date of Patent: Feb. 5, 2008

(54) REMOTE CONTROL TO SET A NORMAL STATE IN A REMOTE DIGITAL CONTROL TERMINAL

(76) Inventor: Nien-Fu Hsu, No. 5, Lane 373, Sec. 1, Mingjhih Rd., Taishan Township, Taipei County 243 (TW)

( * ) Notice: Subject to any disclaimer, the term of this patent is extended or adjusted under 35 U.S.C. 154(b) by 246 days.

(21) Appl. No.: 11/140,937

(22) Filed: Jun. 1, 2005

(65) Prior Publication Data

US 2006/0273921 A1    Dec. 7, 2006

(51) Int. Cl.
*G05B 23/02* (2006.01)
(52) U.S. Cl. .............. 340/825.69; 340/539.1; 340/5.61; 340/5.64; 340/539.11
(58) Field of Classification Search ............ 340/539.1, 340/539.11, 5.61, 5.64, 5.8, 825.69, 3.9, 507, 340/593.11
See application file for complete search history.

(56) References Cited

U.S. PATENT DOCUMENTS 5,600,316 A * 2/1997 Moll ........................ 341/87
6,346,889 B1 * 2/2002 Moss ........................ 340/686.1
2003/0217310 A1 * 11/2003 Ebsen et al. ................. 714/42
2004/0210653 A1 * 10/2004 Kanoor et al. .............. 709/223

\* cited by examiner

*Primary Examiner*—Jeffery Hofsass
*Assistant Examiner*—Yong Hang Jiang
(74) *Attorney, Agent, or Firm*—Troxell Law Office, PLLC

(57) ABSTRACT

Improved remote control structure, wherein a memory, which stores encoded data and normal state data transmitted back from a control terminal, is disposed within a remote control. When the remote control transmits a control signal to the control terminal, the microprocessor first accesses the encoded data stored in the memory, and the control signal is encoded and transmitted to the control terminal. When state data of the control terminal is transmitted back to the remote control, the microprocessor compares the state data with the normal state data stored in the memory. If the comparison is verified, the state data is written to the memory. On the other hand, if the comparison results in an error, the normal state data stored in the memory is transmitted to the control terminal, thereby eliminating the abnormal state of a controlled body recorded in the control terminal and restoring a normal control state thereto.

2 Claims, 6 Drawing Sheets

REMOTE CONTROL TO SET A NORMAL STATE IN A REMOTE DIGITAL CONTROL TERMINAL

BACKGROUND OF THE INVENTION (a) Field of the Invention

The present invention relates to an improved remote control structure, wherein a memory is disposed on a circuit board within a remote control, and preset encoded data and a normal state of a control terminal are stored in the memory.

When using the remote control, a microprocessor first reads encoded data stored in the memory, and then the encoded data and a control signal is transmitted to the control terminal, whereupon a comparison is made with encoded data stored in a memory of the control terminal, where it is identified whether or not the control signal is a correct control signal, and state data this transmitted back to the remote control.

After the remote control receives the state data signal transmitted back from the control terminal, the microprocessor compares the state data of a controlled body (for instance, a car, a steel roller shutter, and so on) recorded in the control terminal with a previous normal state stored in the memory of the remote control, and identifies whether or not the control terminal is in a normal state. If a normal state is verified, then this latest normal state is written into the memory.

On the other hand, if an abnormal state is identified from the comparison, then the microprocessor reads the last normal state stored in the memory and writes it into a control signal, which is then converted into a wireless signal by a wireless transceiver circuit, and a wireless transceiver transmits it to the control terminal, whereupon the last normal state is written into the memory, thereby eliminating the abnormal state of the controlled body recorded in the control terminal and restoring a normal control state thereto.

(b) Description of the Prior Art

Referring to FIG. 1, when using a conventional remote control A, in order to prevent a wireless signal being transmitted to a control terminal, such as a car anti-theft device, a steel roller shutter, and so on, from being affected by interference from other wireless signals or to prevent decryption of the control signal, encoding switches A2 are disposed on a circuit board A1 or analog switches are used to serve as an encoding device.

However, the aforementioned encoding methods are restricted by the number of switches, which thus limit the number of binary digits (bits) of the encoding. Moreover, the number of encodings correspondingly produced by the analog switches are finite, for instance, a 4-switch DIP (dual in-line package) switch is confined to at most 2 to the power 4 (16) different bit combinations, which restricts both the encoding length and number to 16 bits. Hence, decryption of the encoding can be achieved using current computers that are capable of high-speed computation.

Furthermore, if the control terminal is in an abnormal state, for instance, poor contact in the circuits, abnormal electric circuits, and so on, then the conventional remote control A is unable to correct and restore the control terminal to its original normal state, and there is no other method but to return the control terminal to the factory for repairs.

Hence, the inventor of the present invention proposes to resolve and surmount existent technical difficulties to eliminate the aforementioned shortcomings and provide an improved remote control that embodies digitization, advanced encoding and anti-decrypting capabilities, and further includes ability to memorize and restore the normal state of the control terminal.

SUMMARY OF THE INVENTION

Referring to FIG. 2, which shows an exploded view of an improved remote control structure according to the present invention, wherein a circuit board of a remote control B is disposed between a top cover B1 and a bottom cover B2. A microprocessor, a wireless transceiver circuit, a wireless transceiver, a memory, a push button and a battery are disposed on the circuit board.

Referring to FIG. 3, the present invention is characterized in that preset encoded data and normal state of a control terminal are stored in the memory. When the push button is pressed, the microprocessor first reads the encoded data stored in the memory, then the wireless transceiver circuit converts a control signal to a wireless control signal, which the wireless transceiver transmits to the control terminal, whereupon a comparison is made with encoded data stored in an internal memory of the control terminal, where it is identified whether or not the control signal is a correct control signal, and state data is transmitted back to the remote control.

After the wireless transceiver receives the state data signal transmitted back from the control terminal, the wireless transceiver circuit converts the signal data into a control signal, which is encoded and transmitted to the microprocessor. The microprocessor then compares the transmitted encoded data with the encoded data stored in the memory, and identifies whether the state data transmitted back from the control terminal is correct or not. After verification, the state data of a controlled body (for instance, a car, a steel roller shutter, and so on) recorded in the control terminal is compared with the previous normal state stored in the memory, and identifies whether the control terminal is in a normal state or not. If it is verified that the control terminal is in a normal state, then this latest normal state is written into the memory.

On the other hand, if an abnormal state is identified from the comparison, then the microprocessor reads the last normal state stored in the memory and writes it into a control signal, which is then converted into a wireless signal by the wireless transceiver circuit, and the wireless transceiver transmits it to the control terminal, whereupon the last normal state is written into the memory, thereby eliminating the abnormal state of the controlled body recorded in the control terminal and restoring a normal control state thereto.

The battery provides working electric power to each circuit component member of the aforementioned circuit board.

The push button transmits a control signal to the microprocessor of the circuit board, thereby enabling the microprocessor to actuate working of each of the aforementioned circuit component members.

The memory and can be EPROM (Erasable Programmable Read Only Memory), EEPROM (Electrically Erasable Programmable Read-only Memory), FLASH (flash memory) and storage memory of related electronic applications.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
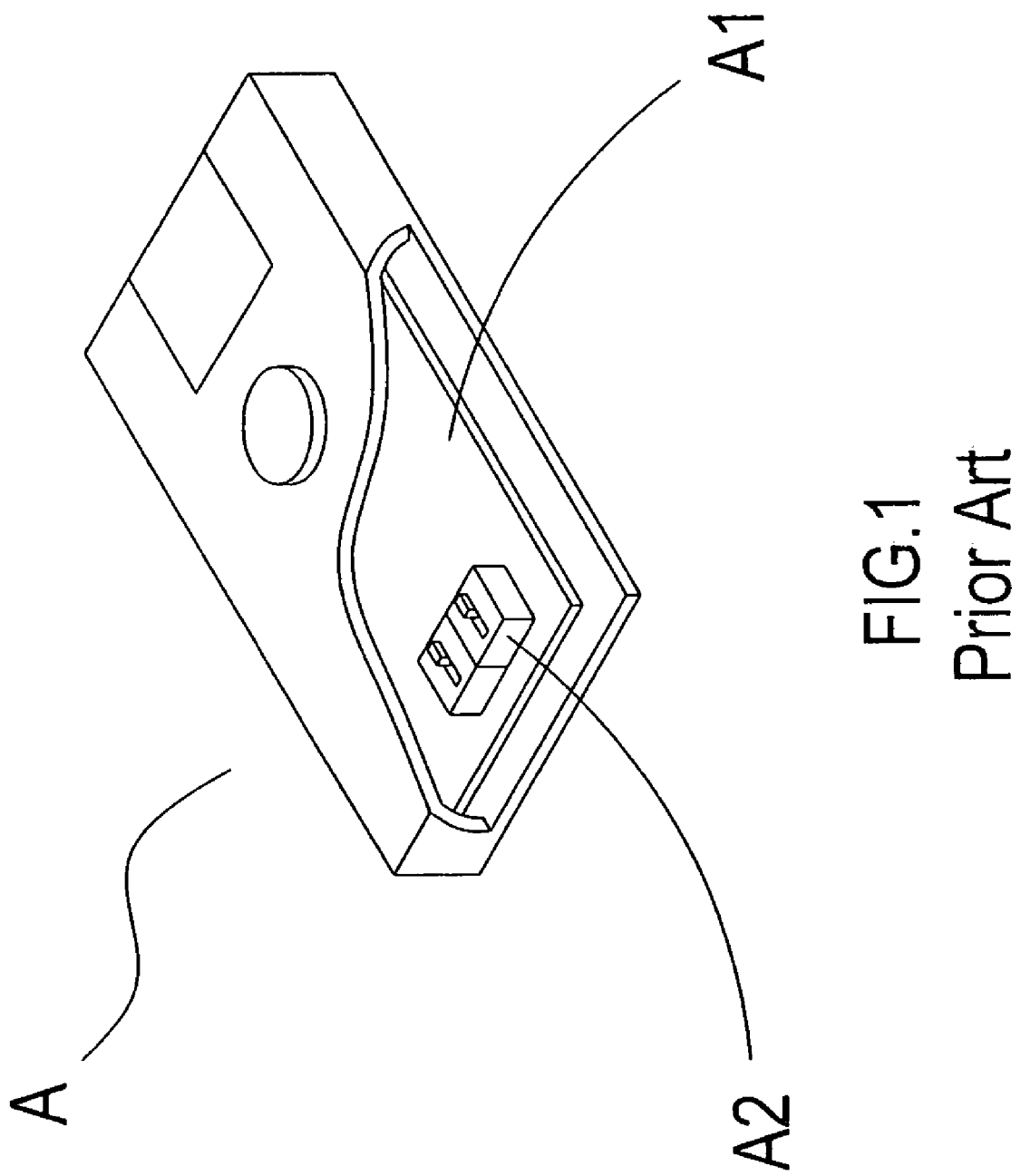
FIG. 1 shows a cutaway view of a conventional remote control.
Figure 2:
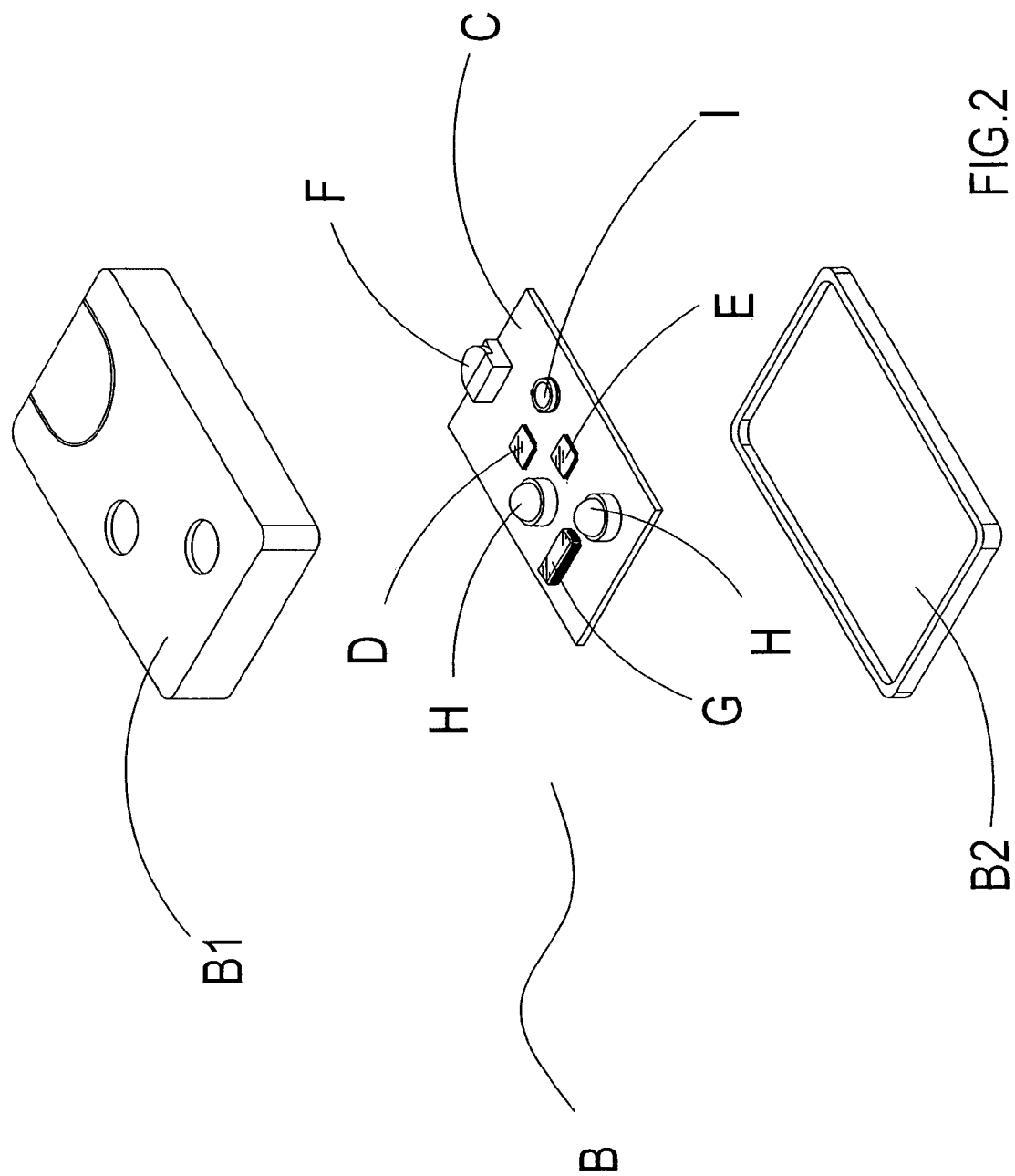
FIG. 2 shows an exploded elevational view according to the present invention.
Figure 3:
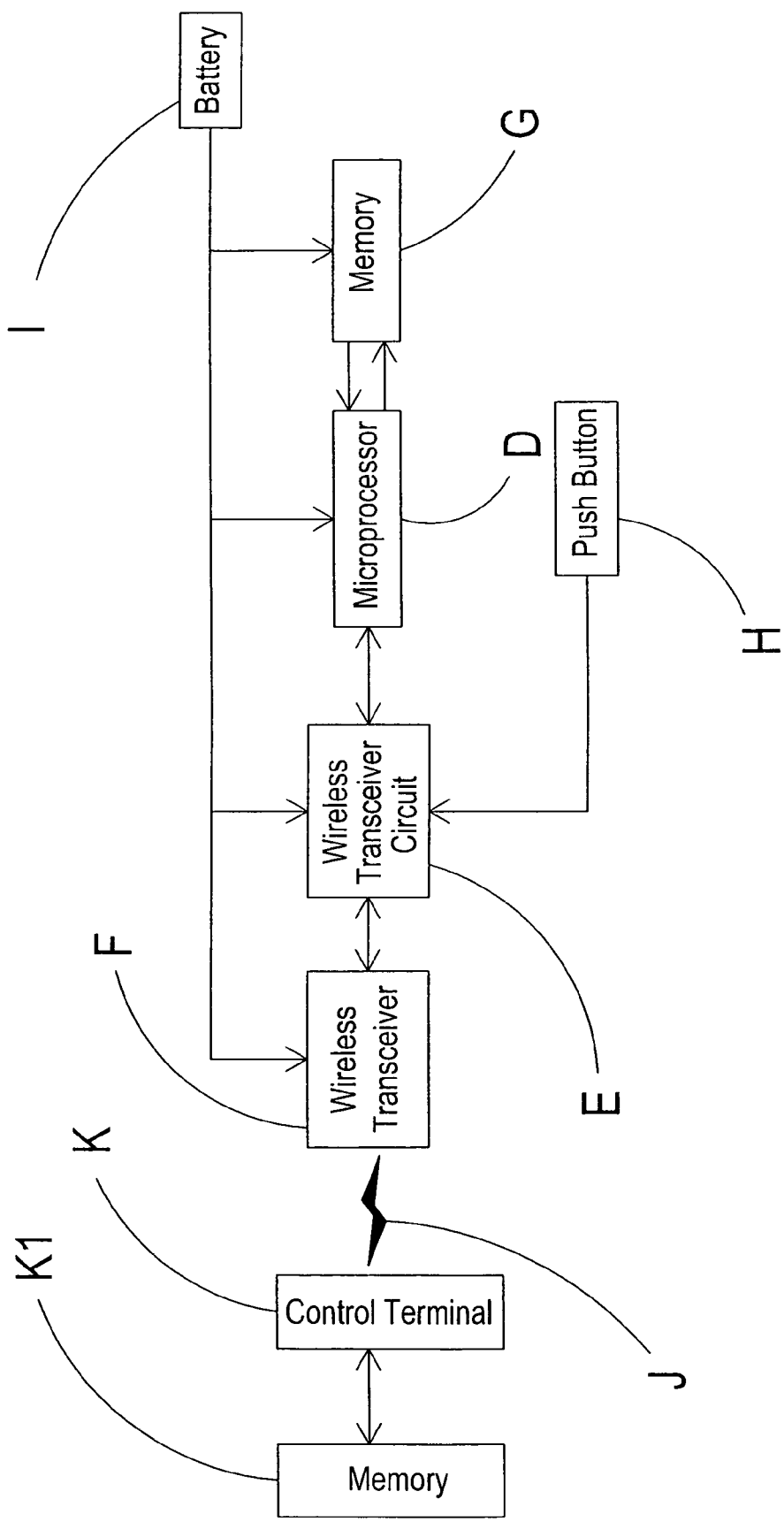
FIG. 3 shows a circuit block diagram according to the present invention.
Figure 4:
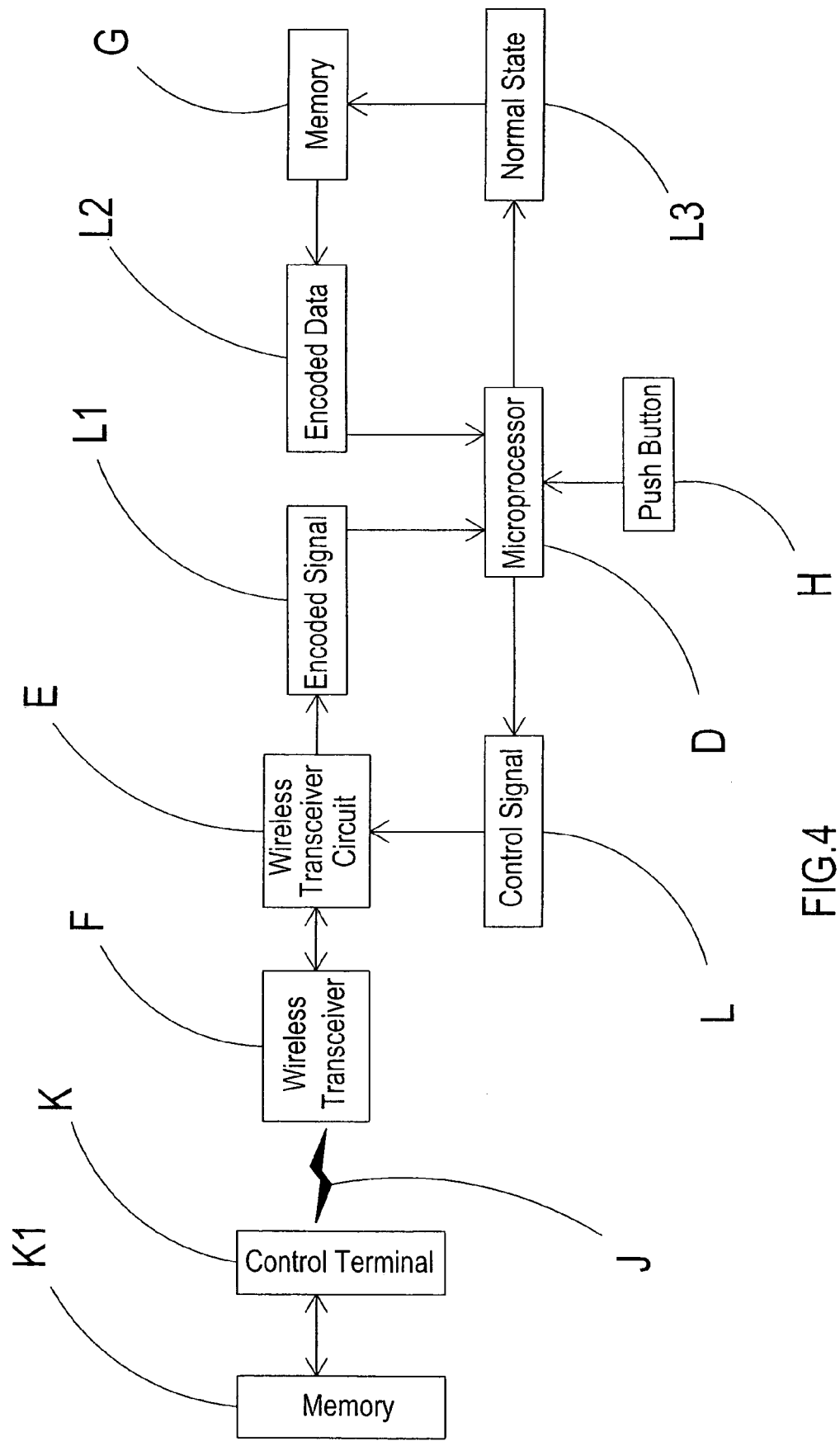
FIG. 4 shows a circuit block diagram of an embodiment according to the present invention (1).
Figure 6:
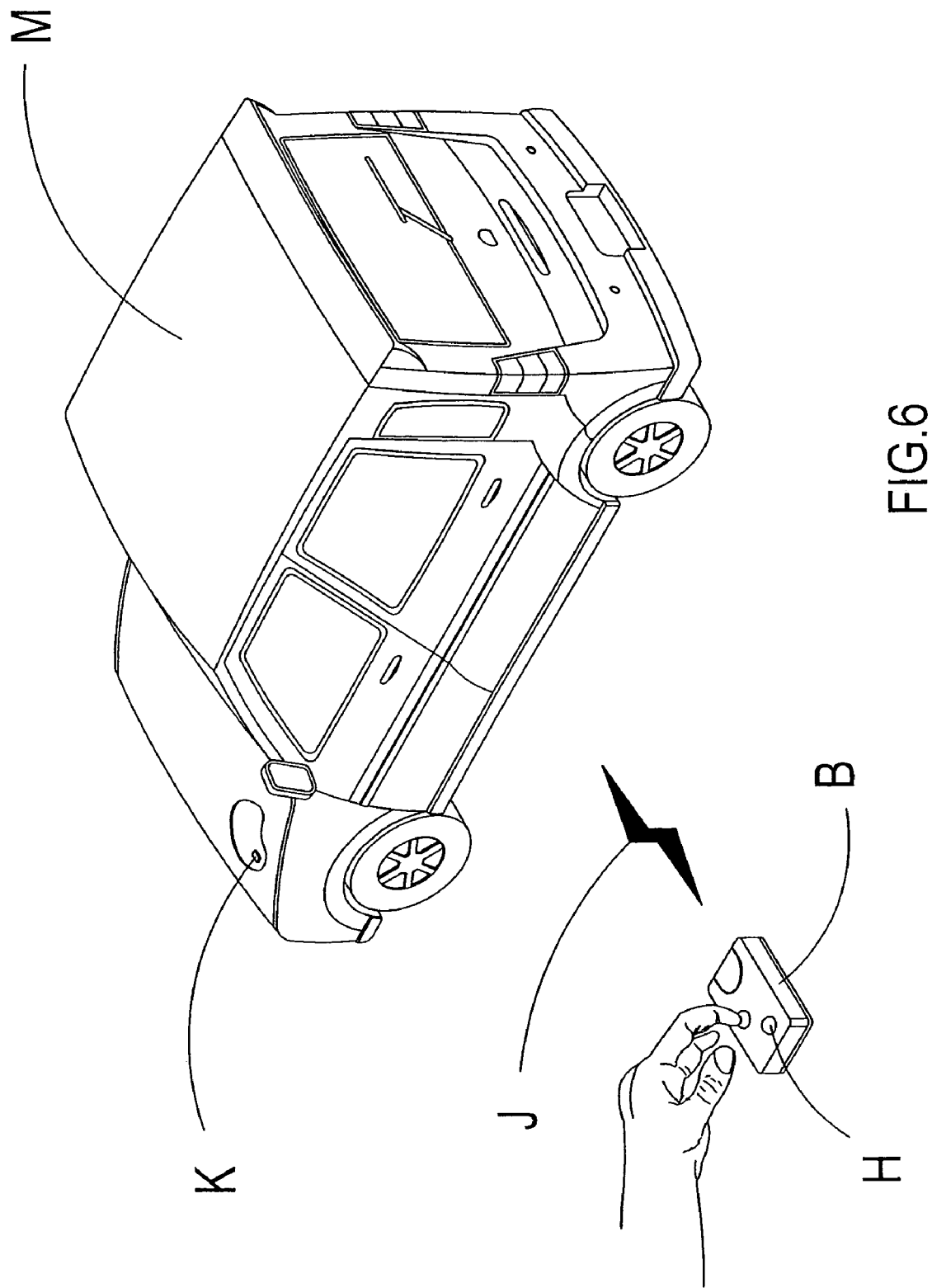
FIG. 6 shows a schematic view of the present invention in use.

Referring to FIGS. 4 and 6, which depict embodiments of a circuit block diagram and a schematic view of the present invention in use respectively. When a push button H of a remote control B of the present invention is pressed, regardless of whether such an action starts the engine of a car M or activates an anti-theft device, a microprocessor D first reads encoded data L2 from a memory G, and a control signal L is then converted into a wireless signal J by a wireless transceiver circuit E, which is transmitted to a control terminal K by a wireless transceiver F> The transmitted control signal J is then compared with encoded data stored in a memory K1 of the control terminal K, where it is identified whether the source of the control signal L is correct or not. After verification, the control terminal K then starts the engine of the car M or activates the anti-theft device, and state data is transmitted back to the remote control B.

After the wireless transceiver F receives the state data signal transmitted back from the control terminal K, the wireless transceiver circuit E converts and encodes it into an encoded signal L1, which is then transmitted to the microprocessor D. The microprocessor D then compares the transmitted encoded signal L1 with the encoded data L2 stored in the memory G, and identifies whether the data transmitted back from the control terminal K is correct or not. After verification, the state data of the car M recorded in the control terminal K is compared with a previous normal state L3 stored in the memory G, and identifies whether the control terminal K is in a normal state or not. If it is verified that the control terminal K is in a normal state, then this latest normal state L3 is written into the memory G.

Figure 5:
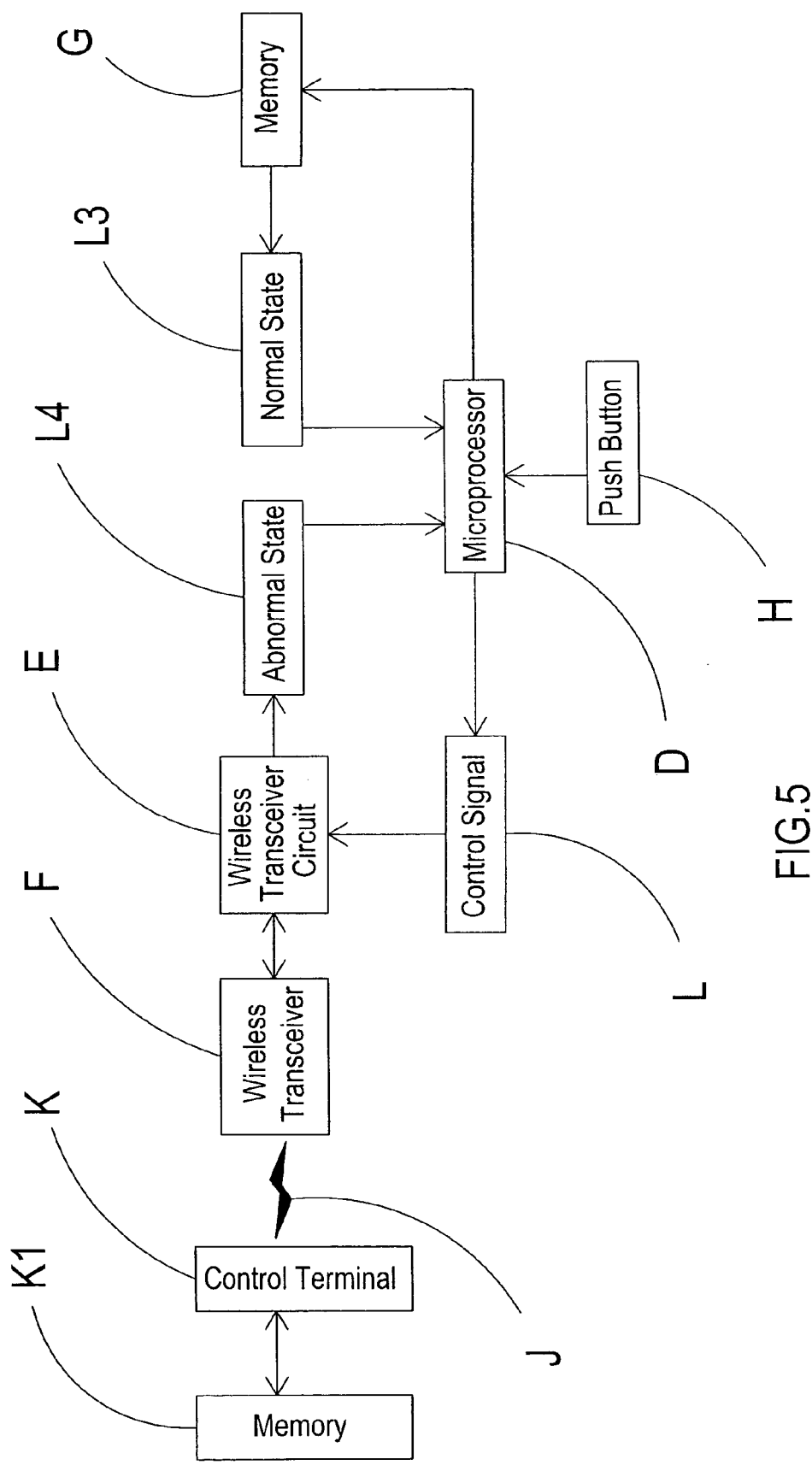
FIG. 5 shows a circuit block diagram of the embodiment according to the present invention (2).

If an abnormal state is detected from the comparison (see FIG. 5), after the wireless transceiver F receives the state data signal transmitted back from the control terminal K, the wireless transceiver circuit E converts and encodes the state data signal into an encoded signal L1, which is then transmitted to the microprocessor D as encoded data. The microprocessor D then first compares the transmitted encoded data with the encoded data L2 stored in the memory G, and identifies whether the data transmitted back from the control terminal K is correct or not. After verification, the state data of the car M recorded in the control terminal K is compared with the previous normal state L3 stored in the memory G, and identifies whether the control terminal K is in a normal state or not. If it is identified that there is an abnormal state L4, then the microprocessor D reads the last normal state L3 stored in the memory G, which is then written into the control signal L. The wireless transceiver circuit E then converts the control signal L into the wireless signal J, which the wireless transceiver F transmits to the control terminal K, thereby eliminating the abnormal state of the car M recorded in the control terminal K and restoring a normal control state.

In order to better explicitly disclose advancement and practicability of the present invention, a comparison with prior art is described hereinafter:

Shortcomings of Prior Art:

1. Adopts analog switch encoding, which limits the number of encoded binary digits and number of encodings.

2. As a result of shortcoming 1, the conventional remote control is easily decrypted by persons familiar with such art, and thus has poor confidentiality capability.

3. The analog switches are large in size, and thus large numbers cannot be installed in the remote control or control terminal.

4. Unable to eliminate or correct an abnormal state in the control terminal.

5. As a result of shortcoming 4, convenience of using the conventional remote control is reduced and frustration is increased.

Advantages of the Present Invention:

1. The remote control is completely digitized.

2. The encodings are digitized, thereby increasing number of binary digits of the encodings and number of encodings.

3. As a result of advantage 2, the remote control enhances confidentiality, anti-theft anti-replication capabilities.

4. Memorizes normal state of the control terminal in the memory.

5. As a result of advantage 4, the remote control can restore and eliminate an abnormal state of the control terminal.

6. Provided with advancement, practicability, convenience and confidentiality, anti-theft anti-replication capabilities.

7. Enhances commercial competitiveness.

In conclusion, the present invention in surmounting structural shortcomings of prior art has assuredly achieved effectiveness of anticipated advancement, and, moreover, is easily understood by persons unfamiliar with related art. Furthermore, contents of the present invention have not been publicly disclosed prior to this application, and practicability and advancement of the present invention clearly comply with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A remote control structure, comprising a circuit board of a remote control disposed between a top cover and a bottom cover, and characterized in that a microprocessor, a wireless transceiver circuit, a wireless transceiver and a memory are disposed on the circuit board; encoded data and latest normal state data of a control terminal are stored in the memory; the microprocessor first accesses the encoded data stored in the memory so that when the remote control transmits a control signal to the control terminal identification of the control signal can be made, and state data of the control terminal is transmitted back to the remote control for the microprocessor to further identify; the microprocessor compares the state data transmitted back from the control terminal with the latest normal state data, if the comparison is verified, the state data is written to the memory, if the comparison results in an error, the latest normal state data stored in the memory is written to the control terminal; the wireless transceiver and the wireless transceiver circuit carry out transmission and reception of a wireless signal between the remote control and the control terminal, a memory corresponding to the memory of the remote control is disposed in the control terminal.

2. The remote control structure as described in claim 1, wherein the memory is selected from the group consisting of EPROM, EEPROM, and FLASH.

* * * * *